May 28, 1957
A. VIG
2,793,772
HAY LOADER AND STACKER
Filed Jan. 3, 1955
3 Sheets-Sheet 2
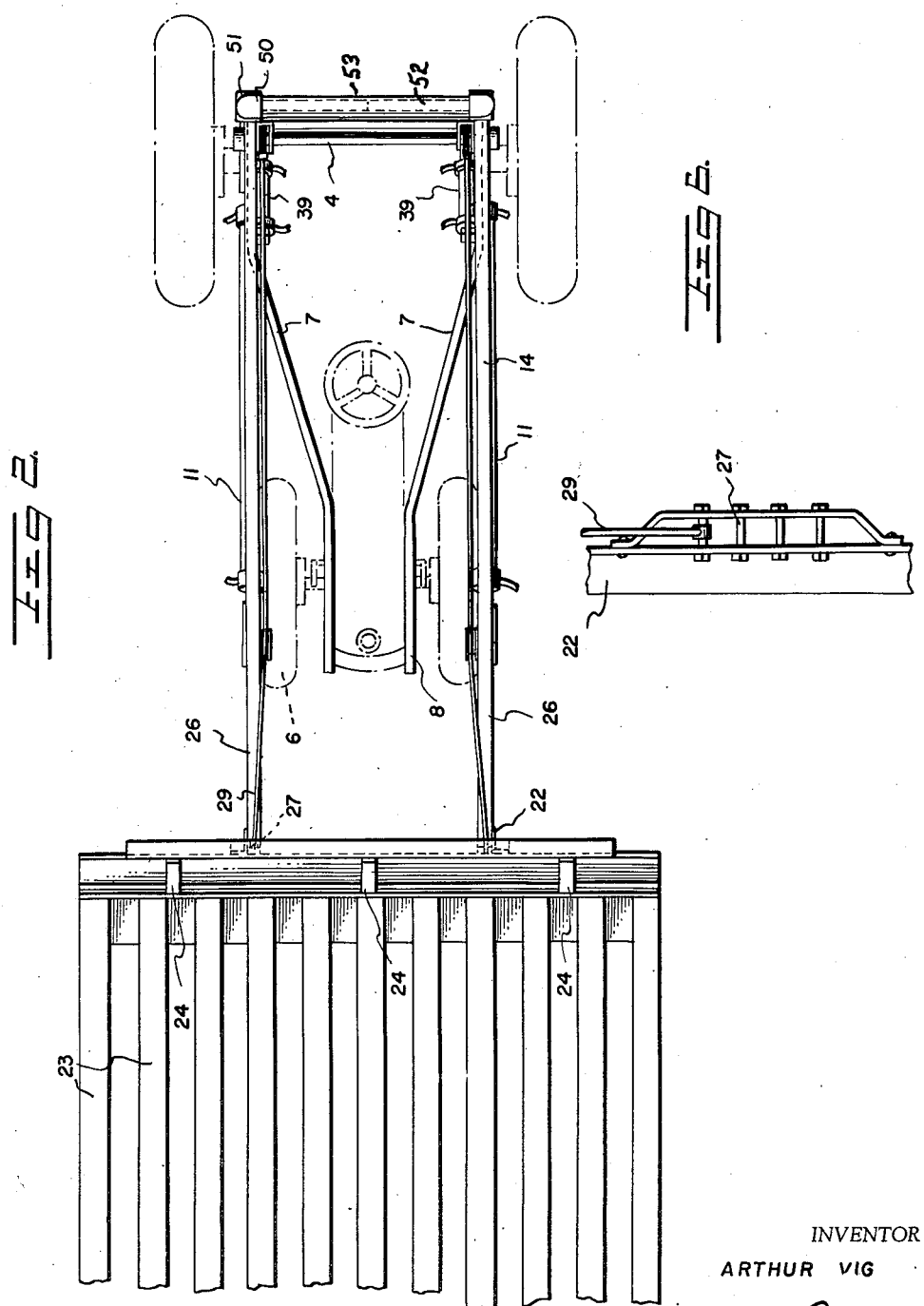
INVENTOR
ARTHUR VIG
BY Mason, Mason & Sheridan
ATTORNEYS

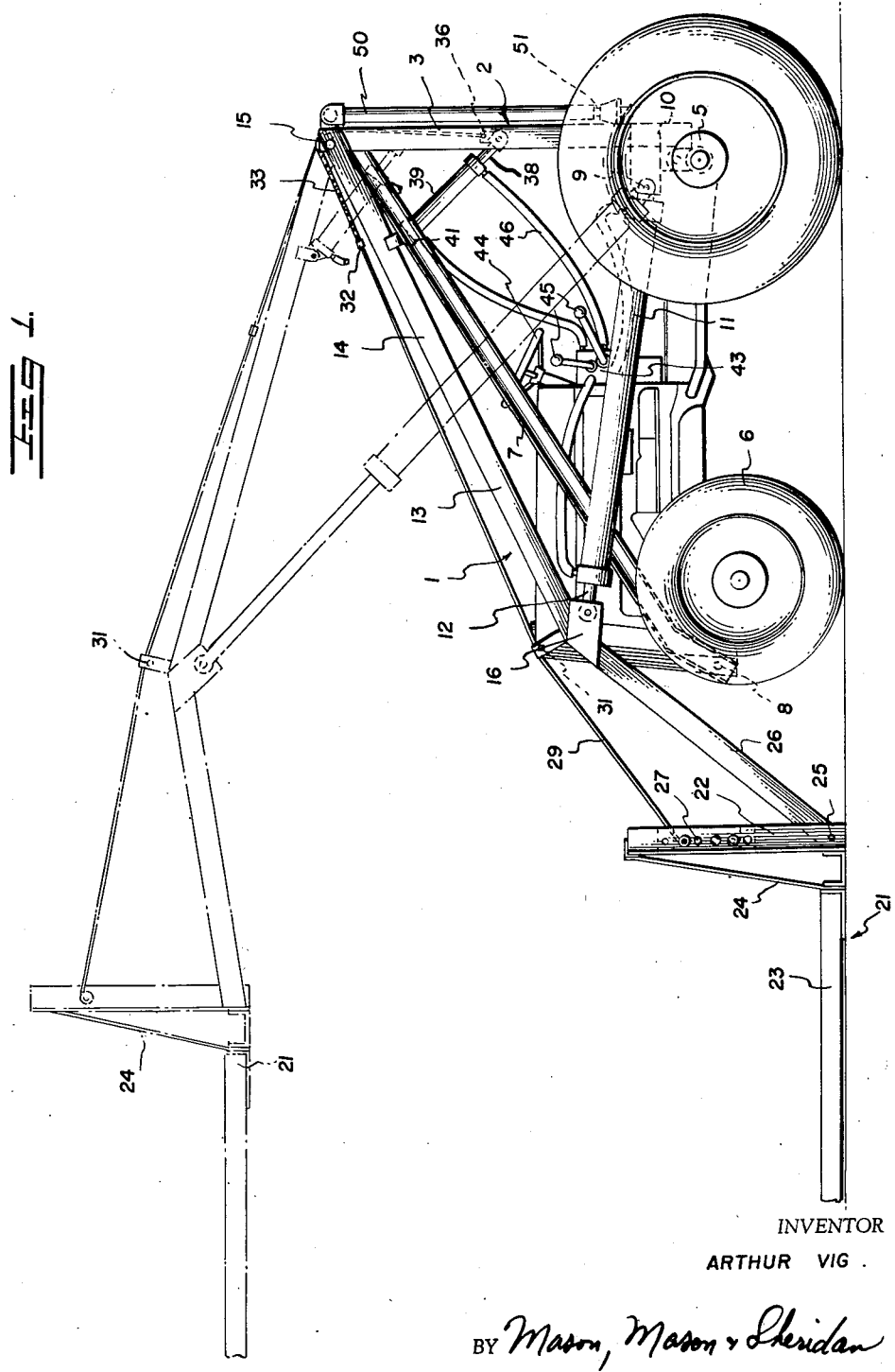

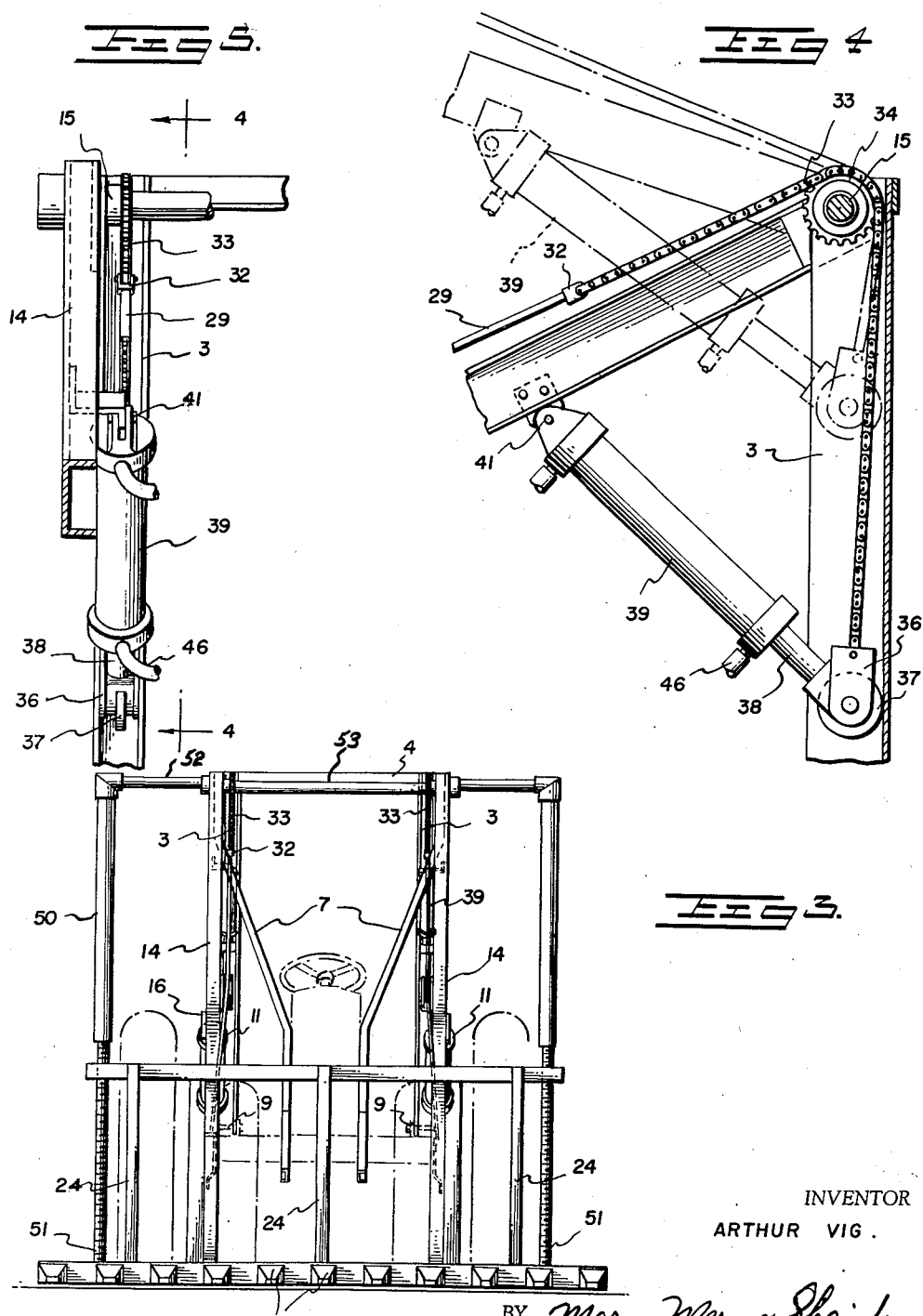

United States Patent Office 2,793,772
Patented May 28, 1957

2,793,772
HAY LOADER AND STACKER
Arthur Vig, Sturgis, S. Dak.

Application January 3, 1955, Serial No. 479,343

9 Claims. (Cl. 214—140)

This invention relates to a tractor mounted loading implement particularly adapted for use in picking up hay or the like from the ground and hoisting or elevating the same.

As is well known, devices of this general type, such as shown in U. S. Patents Nos. 2,295,917, Schwan; 2,300,- 731, Knarreborg; 2,367,932, Dunn; and 2,427,461, Johnson; are secured to a conventional farm tractor whereby they may be driven over the ground with the sweep or pick-up being positioned forwardly of the tractor and substantially level with the ground so that the material, such as hay, may be picked up and elevated and carried to a desired location, whereupon the sweep may be tilted to drop its picked-up load. To the best of my knowledge, prior art devices have encountered extreme difficulty in attempting to maintain the forks or lifting fingers of the sweep or pick-up level or in a horizontal plane during elevation and carrying of the material over the ground. Further, it has been awkward and cumbersome to quickly and readily attach or detach such an implement to a tractor without employing a considerable number of additional parts.

It is an object of this invention to provide a loading implement overcoming the above enumerated difficulties and having automatic means for maintaining the lifting forks of the sweep level during elevation.

Still another object of this invention is to provide a loading implement which may be easily attached to a conventional tractor and when detached may be supported on the ground in such a position that the tractor may be driven from or within the confines thereof.

Finally, another object of this invention is to provide a tractor mounted loading implement which is durable, simple to construct, and relatively inexpensive to manufacture.

Other objects and advantages of the invention will be apparent from the following description in light of the accompanying drawings, wherein:

Figure 1 is a side elevational view of the tractor mounted loading implement;

Figure 2 is a top plan view thereof;

Figure 3 is a front elevational view thereof;

Figure 4 is a fragmentary elevational view of a portion of the leveling mechanism taken along the lines 4—4 of Figure 5;

Figure 5 is also an elevational view of the showing in Figure 4; and

Figure 6 is a fragmentary view of a portion of the sweep.

The embodiment of the invention illustrated comprises a base structure of any suitable durable material which is designated generally by reference character 1 and comprises a substantially upright member 2 having vertical sides 3 and a top extension 4 connected in the form of a substantial U. The upright member 2 has secured at the bottom of its sides 3 support means 10 detachably connected by any suitable means with the rear axle housing 5 of the tractor generally represented by numeral 6. It should be pointed out that tractor 6 is of the conventional type as illustrated schematically in Figures 1, 2 and 3 of the drawings.

Rigidly connected adjacent the upper ends of sides 3 are braces 7 and the ends of these braces, which are forwardly and downwardly directed with respect to the tractor, are detachably connected to the body of the latter at the front portion thereof by any suitable means, such as shown at 8. Numeral 9 represents a pivot on each support means 10 about which a hydraulic cylinder unit 11 pivots. The actuating rod 12 of each cylinder 11 is integrally connected with an elongated portion 13 of frame 1 and, as illustrated, the portion 13 has sides 14 pivotally mounted at one end thereof by means of rod or shaft 15 to top extension 4. The connection between actuating rod 12 and elongated portion 13 may be of any suitable type and as shown at 16.

Numeral 21 generally represents a sweep or pick-up device having an upright section 22 and a plurality or series of tines or pick-up fingers 23, suitable brace means 24 also being employed. The upright part of sweep 21 is pivotally connected at 25 to elongated portion 13 through an integral extension 26.

Provided at each end of upright 22 are a plurality of means or connectors 27 to one of which is attached rigidly one end of a cable 29 and, as illustrated, the cable 29 is connected by any suitable means to the uppermost connector 27. It is to be understood that a cable 29 extends, as shown in Figures 2 and 3, from each side of the upright member. Each cable 29 extends over a guide roll 31 connected to each side 14 and thence each cable is connected, by any suitable means 32, to a chain 33 which travels over a sprocket 34 rotatably mounted on shaft 15, the end of the chain being connected by suitable means 36 to a roller 37. Each roller 37 has a pin passing therethrough onto which actuating rod 38 of a hydraulic cylinder unit 39 is secured. Each unit 39 is pivotally connected to a side 14 as at 41. It is to be noted that each side 3 is U-shaped to provide a track or guide for vertical movement of each roller 37.

A pump, not shown, is mounted on frame 1 by any suitable means, preferably adjacent the steering wheel 44, and said pump is arranged for connection, by any suitable means such as a belt and pulley, not shown, to the power take-off shaft of the tractor. A supply tank, not shown, is preferably mounted on one of the sides 3 and is filled with oil or other hydraulic fluid with a supply line leading to the pump. Connected with the pump, in conventional manner, is a valve housing 43 having control handles 45, one for operating in conventional interlocking relationship cylinders 39, and the other for operating in conventional interlocking relationship cylinders 11. Fluid conduits to the cylinders are illustrated schematically at 46 in Figure 1 and, of course, the pump is designed to take fluid under pressure to the valve housing 43 for distribution thereby.

Referring particularly to Figure 1, the implement is shown in solid lines connected to the tractor 6 and with the sweep 21 resting on the ground. Attached by any suitable means to top extension 4 is a pair of jacks 50 of, for example, the screw type having feet portions 51, each jack being provided with means for vertically adjusting the feet 51 with respect to ground, as illustrated in Figure 1. Therefore, it can be seen that by placing the feet 51 on the ground and disconnecting the implement from the tractor at 10 and 8, the tractor may be backed out from within the confines of the implement and the feet 51, together with the pick-up device 21, will support the implement on the ground. When it is desired to use the implement again, it is merely necessary to drive the tractor into the position shown in Figure 1, make the necessary connections at 8 and 10, and raise the feet 51 to, for example, the dotted line position of Figure 1. Further, tops of jacks 50, as shown in Figures 1, 2 and 3, are constructed for telescoping and rotative or pivoting action at 52 and 53 so that when positioned with the feet 51 on the ground, the jacks may be outwardly of the tractor wheel or body a substantial distance, as in Figure 3, and after the implement is secured to the tractor, the parts 52 may be pivoted with respect to and moved within parts 53 so that the jacks may be positioned as illustrated in Figures 1 and 2.

In use, the tractor with the implement mounted thereon is driven over the ground with the sweep 21 moving ahead substantially level with the ground and the fingers thereof 23 are utilized in conventional manner to pick up a load of hay or the like. After this, the sweep 21 is vertically elevated to, for example, the dotted line position shown in Figure 1, and during this elevation it is highly desirable and essential that the forks 23 remain level and are maintained in a horizontal plane. This is accomplished by the present invention by means of the cylinder units 11 in combination with units 39 functioning with cable 29 and chain means 33 and rollers 37. In the first place, by operating levers 45 for rollers 37, the latter by means of rods 38 are positioned at the desired elevation within guides 3 to provide sufficient cable and chain means to maintain fingers 23 level. Thereafter, the lever means 45 for cylinders 11 is operated to actuate rods 12 and thereby lift or elevate elongated portion 13 and, during this elevation, the sweep 21 is also elevated but is maintained level or in its previously set position due to the fact that rollers 37 rise in guides 3 as shown in dotted lines in Figures 1 and 4 and thereby maintain the proper tension on cables 29. During the rise of rollers 37 it is usually necessary to actuate rods 38 a slight amount to maintain the sweep level, the increment of adjustment of rods 38 during elevation being approximated in dotted lines in Figure 4. When it is desired to tilt fingers 23 either upwardly or downwardly, the latter when unloading and the sweep is in the dotted line position shown in Figure 1, it is merely necessary to operate, through one of the levers 45, cylinders 39 and rods 38 independently of the lifting units which will result in raising within uprights 3 the rollers 37 and the latter in turn, through chains 33 and cables 29, lowers sweep 21 about pivot 25. Of course, it is to be understood that throughout the elevating of sweep 21, tilting upwardly or downwardly thereof may be accomplished by lowering or elevating rollers 37 within guides 3.

Generally, sweep or pick-up units, such as at 21, include a pusher mechanism operable, by, for example, additional cylinders and rods controlled at 43, for aiding in unloading the material from forks 23 and since such is standard it is not being illustrated.

The above description and drawings disclose a single embodiment of the invention for maintaining sweep 21 level during elevation and for permitting ready attachment of the implement to the tractor as specific language has been employed in describing the several figures. It will nevertheless be understood that no limitations of the scope of the invention are thereby contemplated, and that various alterations and modifications may be made such as would occur to one skilled in the art to which the invention relates.

I claim:

1. A tractor mounted loading implement comprising a frame connected to the tractor, said frame having a substantially upright member, an elongated portion pivotally connected adjacent one end thereof to said member, a sweep pivotally mounted to said elongated portion adjacent the other end thereof whereby said sweep is positioned substantially forwardly of the front of the tractor, lifting means connected to said member and elongated portion for pivoting the latter and thereby elevating or lowering the sweep with respect to the ground, roller means movable in said upright member, additional actuating means connected between said roller means and said elongated member, a cable means connected with said roller means and said sweep whereby said additional actuating means, roller means and said cable means control the pivot of said sweep and means to operate said lifting and said actuating means.

2. Apparatus as defined in claim 1, wherein said lifting and said actuating means includes hydraulic cylinders and said cable means is trained over a plurality of guide wheels on said elongated member.

3. Apparatus as defined in claim 1, wherein said sweep includes a plurality of pick-up fingers and said actuating means and cable means are operated during movement of said lifting means and may be operated independently of the latter.

4. A tractor mounted loading implement comprising a frame detachably connectable to the tractor, said frame having a substantially upright member, an elongated portion pivotally connected adjacent one end thereof to said member, a sweep pivotally mounted to said elongated member adjacent the other end thereof whereby said sweep may be positioned substantially forwardly of the front of the tractor when connected thereto, lifting means connected to said member and elongated portion for pivoting the latter when connected to the tractor and thereby elevating or lowering the sweep with respect to the ground, roller means mounted for movement in said upright member, additional actuating means connected between said roller means and said elongated member, cable means connected with said roller means and said sweep whereby said additional actuating means and said cable means are arranged to control the pivot of said sweep and means to operate said lifting and said actuating means when the member is connected to said tractor, said frame having supported thereon at least one adjustable jack adapted to engage the ground and thereby support with the sweep on the ground the implement independently of the tractor.

5. Apparatus as defined in claim 4, wherein said jack is secured to said elongated member adjacent the one end thereof, said jack including telescoping sections permitting compactness thereof and a foot portion for engagement with the ground.

6. A tractor mounted loading implement comprising a frame connected to the tractor, an elongated portion pivotally connected adjacent one end thereof to said frame, a sweep pivotally mounted to said elongated portion adjacent the other end thereof whereby said sweep is positioned substantially forwardly of the front of the tractor, lifting means connected to said frame and elongated portion for pivoting the latter and thereby elevating or lowering the sweep with respect to the ground, means movable on said frame, additional actuating means for controlling the movement of said movable means pivotally connected between said movable means and said elongated member, flexible means connected with said movable means and said sweep whereby said additional actuating means, movable means and said flexible means cooperate to control the pivot of said sweep and means to operate said lifting and said actuating means.

7. Apparatus as defined in claim 6, wherein said lifting and said actuating means includes hydraulic cylinders and said flexible means is trained over a plurality of guide wheels on said elongated member.

8. Apparatus as defined in claim 6, wherein said sweep includes a plurality of pick-up fingers and said actuating means and flexible means are operated during movement and said lifting means and may be operated independently of the latter.

9. A tractor mounted loading implement comprising a frame connectable to the tractor, an elongated portion pivotally connected adjacent one end thereof to said frame, a sweep pivotally mounted to said elongated portion adjacent the other end thereof whereby said sweep may be positioned substantially forwardly of the front of the tractor when connected thereto, lifting means connected to said frame and elongated portion for pivoting the latter when connected to the tractor and thereby elevating or lowering the sweep with respect to the ground, means mounted for movement on said frame, additional actuating means connected between said movable means and said elongated member, flexible means connected with said movable means and said sweep whereby said additional actuating means, movable means and said flexible means are arranged to control the pivot of said sweep and means to operate said lifting and said actuating means when the member is connected to said tractor, said frame having supported thereon a pair of jacks, said jacks having feet portions adapted to engage the ground and thereby support with the sweep on the ground the implement independently of the tractor.

References Cited in the file of this patent

UNITED STATES PATENTS 2,538,514    Guignard --------------- Jan. 16, 1951